March 8, 1938. D. G. MacCULLOCH 2,110,711
TWO-SPEED SUPERCHARGER
Filed Oct. 19, 1935
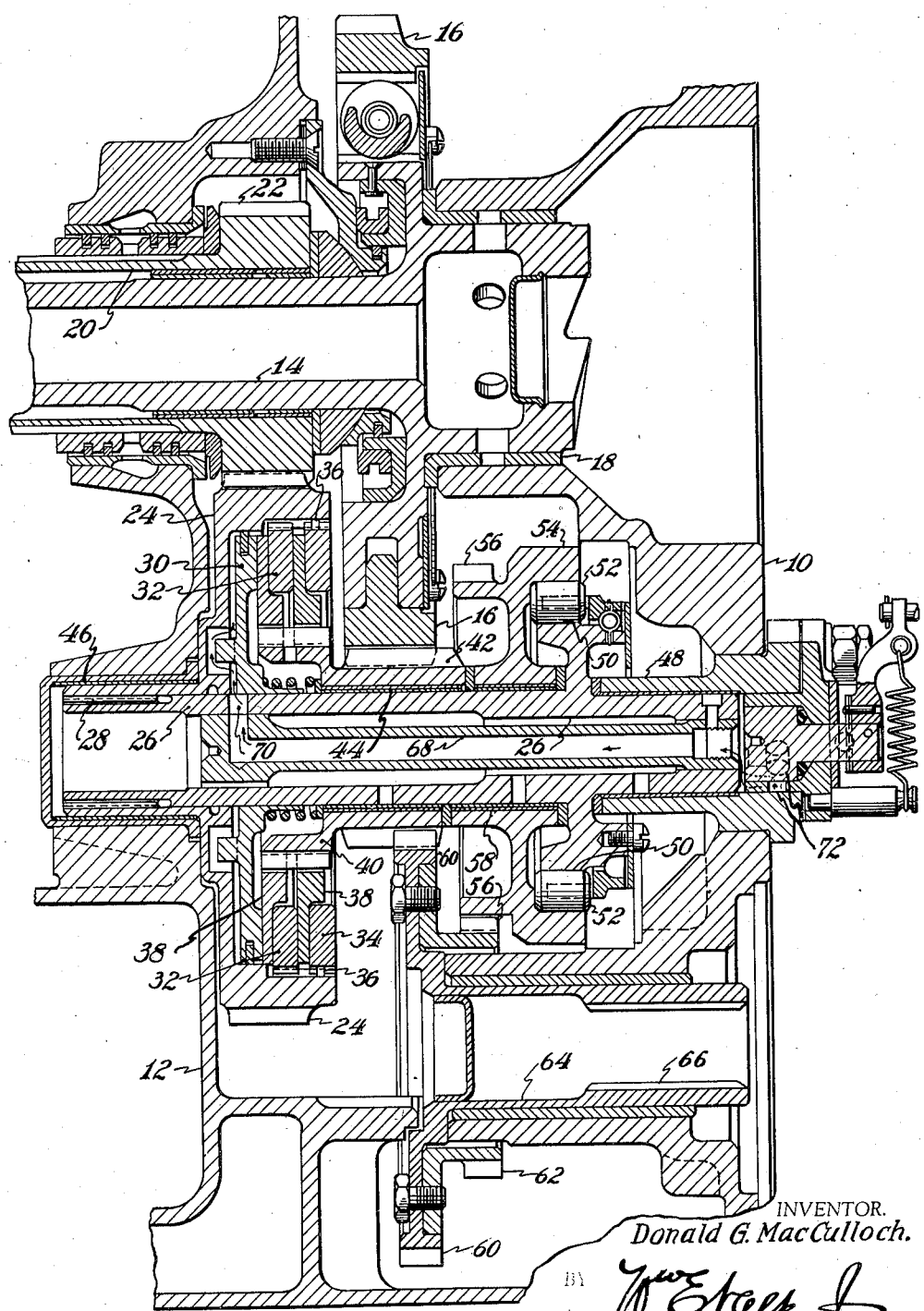
INVENTOR.
Donald G. MacCulloch.
ATTORNEY.

Patented Mar. 8, 1938

2,110,711

UNITED STATES PATENT OFFICE

2,110,711
TWO-SPEED SUPERCHARGER

Donald G. MacCulloch, Hawthorne, N. J., assignor to Wright Aeronautical Corporation, a corporation of New York Application October 19, 1935, Serial No. 45,774

6 Claims. (Cl. 74—368)

This invention relates to two-speed gearing, and in the specific showing of the drawing to a two-speed drive suited for engine superchargers. In certain respects the invention comprises improvements on the co-pending application of Chilton, Serial No. 680,495, filed July 14, 1933, and utilizes much of the structure there disclosed.

Objects of the invention are to simplify the construction by utilizing back gears for the reduced speed drive in place of the planetary gears disclosed in the above identified application. Other objects of the invention will be obvious from or will be pointed out in the following description:

With reference to the drawing, which is a longitudinal section through the shaft axes of the device, 10 and 12 designate housings similar to those already in use for supercharger drives, and 14 designates a conventional crankshaft extension having a usual main driving gear 16 and supported on a rear bearing 18, the usual crankshaft connection for this shaft 14 occurring beyond the left end of the figure. Freely mounted for rotation around the extension shaft 14 is a usual hollow supercharger shaft, the right-hand end of which is indicated at 20 and which is equipped with a usual supercharger drive pinion 22. Meshed with this pinion 22 is a gear 24 splined to a layshaft 26, at 28, for unitary rotation. This gear is counterbored as a cylinder and contains an hydraulic piston 30, the gear having splined into it, clutch plates 32, 34, the latter being secured against axial motion by a locking ring 36 engaging grooves in the splines. Intermediate these plates are inner clutch plates 38 splined to an extension 40 of a pinion 42 which is at all times meshed with the main driving gear 16 and is free for rotation on a bushing 44 on the layshaft 26. This layshaft is supported in end bearings 46, 48 in the housings 12 and 10, respectively, and is provided with a cam hub 50 engaging rollers 52 which are in turn engaged within a cylindrical projection 54 of a low speed gear 56 mounted on a bushing 58 for rotation on the layshaft 26. The parts 50, 52 and 54 comprise a conventional one-way roller clutch.

Connecting the pinion 42 and the gear 56 are gears 60, 62, rigid with a side shaft 64 which may conveniently comprise an accessory drive shaft of the engine in which case the shaft will be provided with driving splines 66 to engage the appropriate accessory shaft (not shown).

The layshaft 26 is hollow and is provided with a tubular member 68 communicating at 70 with the clutch piston 30 and with a control valve indicated in general at 72. This valve serves to establish and cut off communication between an engine oil pressure lead (not shown) and the high speed clutch piston 30.

The operation of the device is as follows: The pinion 42 with the driving high speed clutch plates 38 is at all times driven by the main gear 16 and in turn at all times drives the gear 60 of the shaft 64 whose gear 62 at all times drives the gear 56 and roller clutch cylinder 54 and, whenever the hydraulic clutch 30 is disengaged, the roller clutch drives the layshaft and therefore the gear 24 at unitary speed with the low speed gear 56.

It will be noticed that the gear train 42, 60, 62, 56 results in the latter gear and the clutch member 54 rotating at less speed than the pinion 42 and thereby low gear is effective whenever the valve 72 is operated to cut off oil pressure to the clutch 30. When this valve 72 is operated to supply oil pressure to the clutch 30, the gear 24 and the layshaft 26 are clutched together for unitary rotation with the pinion 42 so that the layshaft now travels at higher speed than the roller clutch ring 54, the roller clutch overrunning in the usual way to permit of this high speed drive. Whenever the valve 72 is closed, releasing the hydraulic clutch 30, the drive will automatically "fall back" to be picked up by the roller clutch at the instant the speed falls to the lower speed of this roller clutch driving member.

By adding the gear 62 to the otherwise conventional accessory drive shaft 64 and providing the gear 56 in place of the planetary gears of the Chilton application, a simplified structure is provided, the general objects and advantages of which are similar to those set forth in that application. It will be seen that the shaft 64 with its gears 60 and 62 comprises a "back gear" organization consisting of the back gear shaft 64 and back gears 60 and 62 somewhat similar to that used on a lathe. Operation of the device as a speed reducing drive is simplified by the use of the overrunning clutch 50, 52, 54 and by the use of the simple hydraulically operated clutch in the gear 24. When the oil pressure to the piston 30 is turned off by the valve 72, normal leakage of oil between the several relatively rotating parts will permit the pressure behind the piston to drop off quickly to permit clutch release, whereupon the drive falls back on the back gears 60—62.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with an engine having a supercharger drive gear and a supercharger pinion, of a layshaft including a gear meshed with said supercharger pinion, a pinion meshed with said supercharger gear and rotatable on the layshaft, a second gear on said layshaft, a back-gear shaft, and gears on said back-gear shaft drivably connecting the second said layshaft gear and the layshaft pinion.

2. An engine supercharger drive comprising in combination, a driving gear, a supercharger pinion, a layshaft, a gear and a pinion on the layshaft respectively engaged with the first said pinion and gear, one driving connection between said layshaft pinion and said layshaft gear comprising a back gear shaft having a gear engaged with said layshaft pinion and gears drivably connecting said back gear shaft and said layshaft gear, and another driving connection comprising clutch means for selectively connecting said layshaft gear directly to the layshaft pinion.

3. The combination with an engine of a supercharger drive gear, a supercharger pinion, a layshaft having a pinion and a gear, respectively, engaged with said supercharger gear and supercharger pinion, selectively operable means for clutching said layshaft pinion and gear together for unitary rotation, and a back gear set operative upon declutching of said layshaft gear from said layshaft pinion for driving said layshaft gear at a lesser speed than the speed of said pinion, said back gear set having driving relationship with said layshaft pinion and including a one-way clutch driving connection with said layshaft gear.

4. The combination in an engine supercharger drive, of a supercharger pinion, a layshaft having a gear meshed with the pinion, a driven pinion loosely mounted on the layshaft, clutch means selectively operable to drivably connect said layshaft gear directly with said layshaft pinion, and back gears providing a driving connection between the layshaft gear and the layshaft pinion for reduced speed operation of said layshaft gear, the driving connection including a one-way clutch for overrun during engagement of said selective clutch.

5. The combination with an engine having a drive gear and a supercharger pinion, of a layshaft having a pinion and gear respectively meshed with said drive gear and said supercharger pinion, a back gear shaft having a back gear drivably connected with said drive gear, gears establishing a driving connection between said back gear and said layshaft gear, a first clutch means organized to selectively directly connect and disconnect the layshaft pinion to and from the layshaft gear, and a second clutch means comprising a part of one of the gears which establish the driving connection between the back gear and the layshaft gear for drivably connecting said back gear with said layshaft gear upon disengagement of said first selective clutch means.

6. The combination with an engine having a drive gear and a supercharger pinion, of a layshaft having a gear rotatable therewith and having a pinion loosely mounted thereon, said gear and pinion being respectively engaged with said supercharger pinion and with said drive gear, a slow speed gear on said layshaft, means for driving said slow speed gear from said drive gear, a one-way overrunning clutch between said slow speed gear and the layshaft arranged for overrun of the slow speed gear by the layshaft, and a clutch selectively operable to connect said layshaft with the layshaft pinion for unitary rotation at a speed greater than that of said slow speed gear, said layshaft, when said selective clutch is disconnected, dropping back for rotation with the slow speed gear through said one-way overrunning clutch.

DONALD G. MacCULLOCH.